US012658529B2

(12) United States Patent
Xiao et al.

(10) Patent No.: US 12,658,529 B2
(45) Date of Patent: Jun. 16, 2026

(54) BATTERIES AND BATTERY MANUFACTURE METHODS

(71) Applicant: Battelle Memorial Institute, Richland, WA (US)

(72) Inventors: Jie Xiao, Richland, WA (US); Bingbin Wu, Richland, WA (US); Z. Daniel Deng, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 618 days.

(21) Appl. No.: 16/697,936

(22) Filed: Nov. 27, 2019

(65) Prior Publication Data

US 2020/0358067 A1 Nov. 12, 2020

Related U.S. Application Data

(60) Provisional application No. 62/843,922, filed on May 6, 2019.

(51) Int. Cl.
*H01M 50/46* (2021.01)
*H01M 4/38* (2006.01)
(Continued)

(52) U.S. Cl.
CPC ........... *H01M 50/46* (2021.01); *H01M 4/382* (2013.01); *H01M 4/583* (2013.01); *H01M 50/529* (2021.01); *H01M 50/469* (2021.01)

(58) Field of Classification Search
CPC .... H01M 50/46; H01M 50/529; H01M 4/583; H01M 4/382; H01M 10/0459;
(Continued)

(56) References Cited

U.S. PATENT DOCUMENTS 3,156,585 A * 11/1964 Yamano ................ H01M 10/28
429/94
3,923,543 A * 12/1975 Auborn ................... H01M 6/14
429/344
(Continued)

FOREIGN PATENT DOCUMENTS

WO WO 11/2021
PCT/US2020/016764

OTHER PUBLICATIONS

Bernard ML. Pacing Without Wires: Leadless Cardiac Pacing. Ochsner J. 2016 Fall;16(3):238-42. PMID: 27660571; PMCID:PMC5024804. Retrieved from https://www.ncbi.nlm.nih.gov/pmc/articles/PMC5024804/. (Year: 2016).*
(Continued)

*Primary Examiner* — Matthew T Martin
*Assistant Examiner* — Bartholomew A Hornsby
(74) *Attorney, Agent, or Firm* — Wells St. John P.S.

(57) ABSTRACT

Batteries and associated methods of manufacture are described. According to one aspect, a battery includes a battery case, an anode within the battery case, a cathode within the battery case, a separator configured to electrically insulate the anode from the cathode and the battery case, an electrolyte in contact with the anode and the cathode, and first and second terminal connections connected with respective ones of the anode and the cathode, and wherein the first and second terminal connections are configured to conduct electrons between the anode and the cathode via a load which is external of the battery case.

38 Claims, 4 Drawing Sheets

(51) Int. Cl.
     *H01M 4/583*       (2010.01)
     *H01M 50/469*      (2021.01)
     *H01M 50/529*      (2021.01)

(58) Field of Classification Search
     CPC ......... H01M 10/0468; H01M 10/0481; H01M
                10/0583; H01M 10/0585; H01M 10/0587;
                H01M 10/14; H01M 10/4242; H01M
                10/4235; H01M 50/289; H01M 50/40;
                H01M 50/403; H01M 50/406; H01M
                50/409; H01M 50/461; H01M 50/463;
                H01M 50/466; H01M 50/469; H01M
                50/471; H01M 50/486; H01M 50/489;
                H01M 50/411; H01M 50/431; H01M
                50/449
     See application file for complete search history.

(56)             References Cited

U.S. PATENT DOCUMENTS

| | | | | |
|---|---|---|---|---|
| 4,042,756 | A * | 8/1977 | Goebel | H01M 6/08 |
| | | | | 429/165 |
| 4,382,117 | A * | 5/1983 | Kunze | H01M 50/491 |
| | | | | 429/251 |
| 4,444,857 | A * | 4/1984 | Duchange | H01M 4/58 |
| | | | | 429/219 |
| 5,279,908 | A * | 1/1994 | Bones | H01M 10/39 |
| | | | | 429/102 |
| 6,040,087 | A * | 3/2000 | Kawakami | B22F 1/08 |
| | | | | 429/223 |
| 10,826,062 | B2 | 11/2020 | Christian et al. | |
| 2002/0009631 | A1 * | 1/2002 | Yoshinaka | H01M 10/345 |
| | | | | 429/218.2 |
| 2005/0202320 | A1 | 9/2005 | Totir et al. | |
| 2006/0046135 | A1 * | 3/2006 | Huang | H01M 4/50 |
| | | | | 429/224 |
| 2008/0145749 | A1 * | 6/2008 | Iacovangelo | H01M 4/364 |
| | | | | 29/623.2 |
| 2009/0061323 | A1 | 3/2009 | Totir et al. | |
| 2009/0081552 | A1 * | 3/2009 | Shah | H01M 6/16 |
| | | | | 429/246 |
| 2009/0208832 | A1 * | 8/2009 | Beard | H01M 10/0459 |
| | | | | 156/194 |
| 2011/0045341 | A1 * | 2/2011 | Bak | H01M 10/651 |
| | | | | 429/209 |
| 2011/0097625 | A1 | 4/2011 | Bedjaoui et al. | |
| 2013/0004838 | A1 | 1/2013 | Totir et al. | |
| 2013/0011714 | A1 * | 1/2013 | Han | H01M 50/186 |
| | | | | 429/131 |
| 2014/0011076 | A1 * | 1/2014 | Kanemoto | H01M 4/13 |
| | | | | 429/163 |
| 2015/0295241 | A1 * | 10/2015 | Liang | H01M 4/1397 |
| | | | | 429/50 |
| 2018/0078775 | A1 * | 3/2018 | Linder | A61N 1/056 |
| 2018/0183052 | A1 | 6/2018 | Zhamu et al. | |
| 2018/0269463 | A1 * | 9/2018 | Liu | H01M 10/4235 |

OTHER PUBLICATIONS

Alibaba, "Ecological Friendly Zn/MnO2 AA Alkaline Battery 1.5v lr6", available online at https://www.alibaba.com/product-detail/ecological-friendly-zn-mno2-aa-alkaline_60485363458.html, Nov. 18, 2019, 7 pages.

Chen et al., "Micro-Battery Development for Juvenile Salmon Acoustic Telemetry System Applications", Scientific Reports, Jan. 2014, United Kingdom, 5 pages.

Duracell, "Alkaline-Manganese Dioxide", Product Data Sheet, available online at https://www.duracell.com/en-us/techlibrary/technical-bulletins, Nov. 18, 2019, 13 pages.

MTI Corporation, "Copper Mesh Foil for Bettery Anode Aubstrate (280mm width x 9um thickness) with Optional Length-EQ-bconf-9u", available online at https://mtixtl.com/coppermeshfoilforbat-teryanodesubstrate-eq-bconf-9u.aspx, Oct. 19, 2018, 1 page.

Wang et al., "A Reliable Sealing Method for Microbatteries", Journal of Power Sources 341, 2017, Netherlands, pp. 443-447.

Xiao et al., U.S. Appl. No. 62/843,922, filed May 6, 2019, titled "New Cell Design for Significant Energy Improvement from Microbat-teries", 8 pages.

* cited by examiner

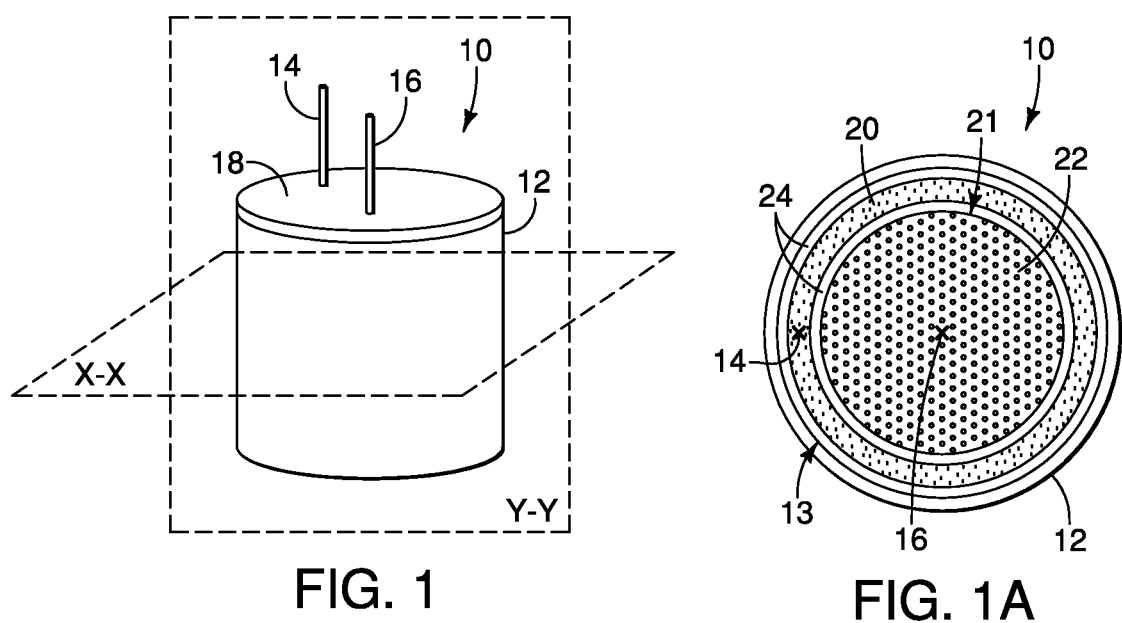
FIG. 1        FIG. 1A
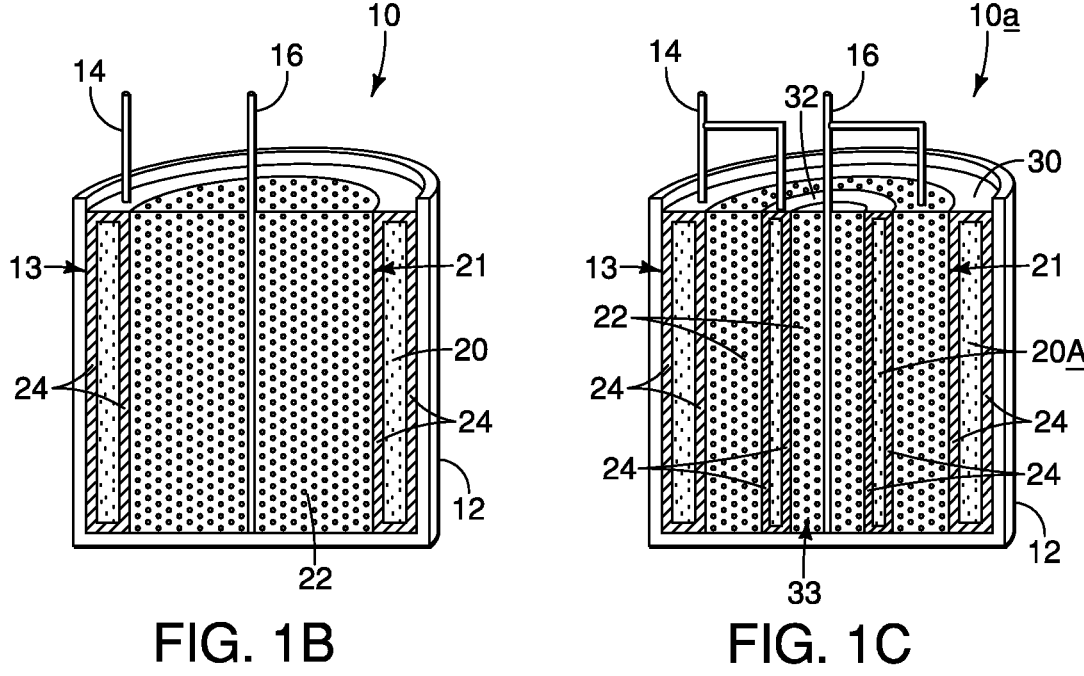
FIG. 1B        FIG. 1C

BATTERIES AND BATTERY MANUFACTURE METHODS

RELATED PATENT DATA

This application claims the benefit of U.S. Provisional Application Ser. No. 62/843,922, which was filed on May 6, 2019, and titled "New Cell Design for Significant Energy Improvement from Microbatteries," the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to batteries and associated methods of manufacture.

BACKGROUND OF THE DISCLOSURE

The types of electrical devices which utilize electrical energy for communications, computing, health, monitoring, entertainment, etc. have increased significantly in recent years. The size of electronic devices has generally decreased while the capabilities and quality of the devices continues to increase as modern electronic components used in such devices are developed and improved upon. Microelectronics have also been developed including miniature transmitters, sensors, and actuators.

Numerous types of batteries are used to provide electrical energy to the electrical devices for use in varied applications with different requirements for electrical energy. However, conventional battery configurations are relatively large in size or have insufficient capacity. The reduction in physical size of the battery impacts the capacity and lifetime of the battery and batteries play a critical role in determining the lifetime of downsized sensors, wearable devices, medical devices, and animal acoustic telemetry transmitters in a few illustrative examples. There are and will continue to be demands for batteries which provide increased energy capacities on a smaller scale for use in the electrical devices including to provide operational energy to microelectronics.

At least some aspects of the disclosure are directed towards batteries including microbatteries and methods of manufacturing batteries as discussed in detail below with respect to example embodiments.

BRIEF DESCRIPTION OF THE DRAWINGS

Example embodiments of the disclosure are described below with reference to the following accompanying drawings.

FIG. 1 is an isometric view of a battery according to one embodiment.

FIG. 1A is a cross-section view of the battery having a first anode configuration and taken along plane X-X of FIG. 1.

FIG. 1B is a cross-section view of the battery having the first anode configuration and taken along plane Y-Y of FIG. 1.

FIG. 1C is a cross-section view of the battery having a second anode configuration and taken along plane Y-Y of FIG. 1.

DETAILED DESCRIPTION OF THE DISCLOSURE

Figures 2A, 2B, 2C:
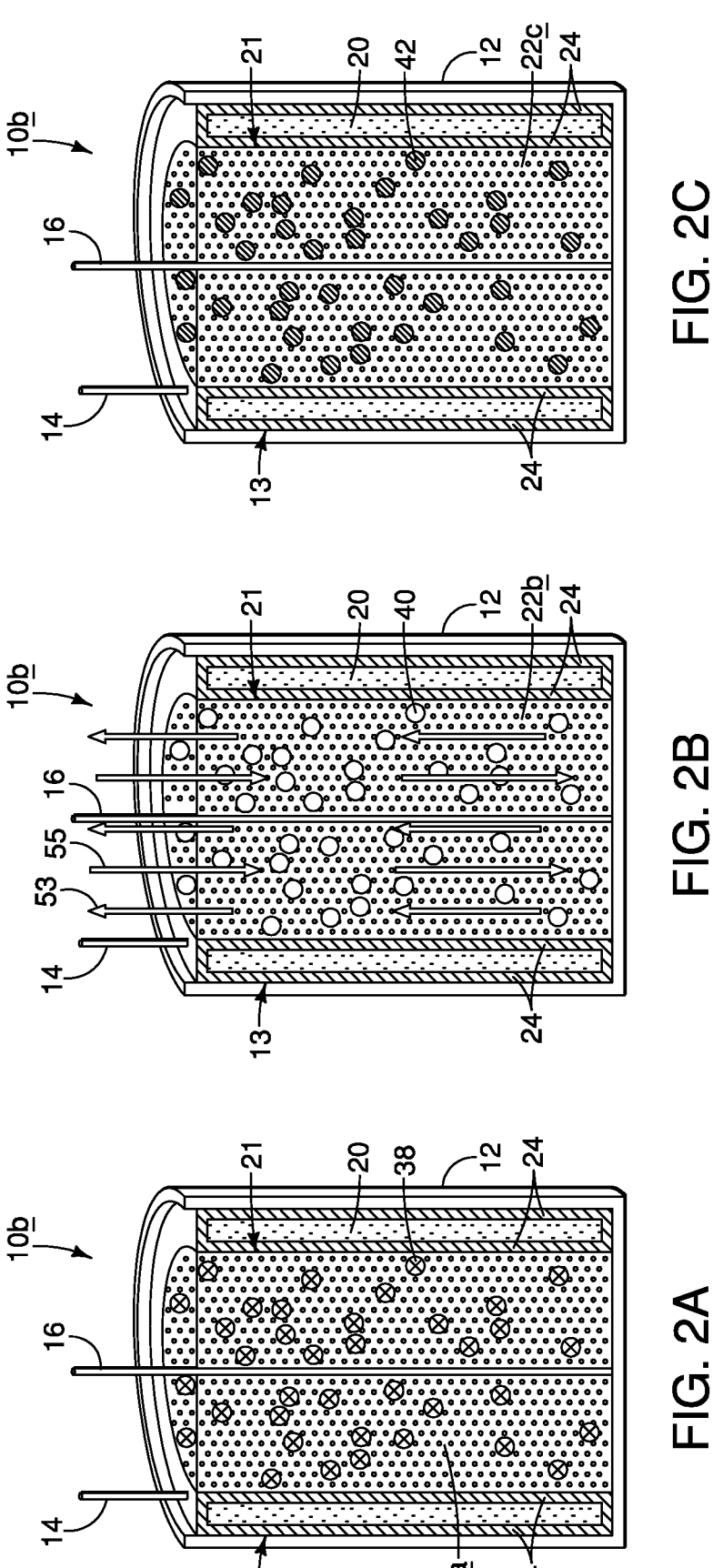
FIGS. 2A-2C illustrate a method of manufacturing a battery according to one embodiment.

This disclosure is submitted in furtherance of the constitutional purposes of the U.S. Patent Laws "to promote the progress of science and useful arts" (Article 1, Section 8).

The present disclosure is directed towards batteries and methods of manufacturing batteries. Example embodiments of the disclosure are described below with respect to compact battery configurations including microbatteries. In some embodiments, the batteries each include an outer cylindrical case configured to house internal components of the individual battery. In a more specific microbattery embodiment, the cylindrical case of the battery has an outside diameter of 1.8 mm and a length of 4.2 mm although the structural and methodologies aspects disclosed herein apply to other batteries having different configurations and/or dimensions. For example, batteries having battery cases that have a diameter within a range of 0.5 mm to 10 mm and a length within a range of 1 mm to 100 mm may also be fabricated according to example embodiments disclosed herein.

Referring to FIG. 1, one embodiment of a battery 10 is shown. The depicted battery 10 includes a cylindrical battery case 12 which comprises aluminum in one implementation. The material of the case 12 can be selected from Al, Cu, Ni, stainless steel or their alloys in some embodiments. For some applications, the surface of the case 12 may be coated with a thin protective layer (not shown), such as a metal layer or polymer layer. Example metal layers include Al, Ni, Cu, Pt, Ag or Au and example polymer layers include polypropylene (PP), polyethylene (PE), polyimide (PI) or their composites. The thin protective layer may also include carbon.

Battery 10 additionally includes an anode terminal connection 14 and cathode terminal connection 16 which are individually configured to conduct electrons between an external load and respective ones of an anode and cathode within battery case 12 (the load, anode and cathode are not shown in FIG. 1). Electrons leave battery 10 via anode terminal connection 14 and are conducted to the cathode terminal connection 16 via the load.

Battery 10 provides operational electrical energy to the load during discharge. Anode terminal connection 14 is a copper wire and cathode terminal connection 16 is a nickel wire in one embodiment. Anode and cathode terminal connections 14, 16 pass through a top structure 18 that along with battery case 12 seals internal components of battery including the anode, cathode, and electrolyte from external elements.

Referring to FIGS. 1A and 1B, interior surfaces of battery case 12 define a volume 13 of battery 10 which receives anode 20, cathode 22 and separator 24.

In one embodiment, anode 20 comprises an active material including lithium metal or its alloy. The lithium metal is pressed or otherwise provided upon a Cu mesh to form anode 20 which is thereafter received within separator 24 in one implementation described further below. Thereafter, the anode 20 and separator 24 are rolled into a cylindrical shape and anode 20 and separator 24 are inserted within volume 13 defined by battery case 12. Separator 24 electrically insulates the anode 20 from the battery case 12 as well as the subsequently-formed cathode 22. An interior surface of anode 20 (and an interior portion of separator 24 adjacent thereto) define another volume 21 which receives cathode 22.

In one embodiment, cathode 22 comprises a mixture of powders including an active material, such as carbon monoflouride (CFx) or manganese dioxide (MnO₂). The mixture of powders of cathode 22 may additionally include a carbon conductive additive such as carbon black (e.g., Super P, Timical) and carbon nanotube (CNT) which increase the electrical conductivity of the mixture of powers of cathode 22. In one embodiment, the mass ratio of CFx in the cathode 22 is 80-99% (or 94-96% for increased capacity), carbon black is 0.5% to 5%, and CNT is 0.5% to 5%. In one more specific embodiment, cathode 22 has a mass ratio of CFx, Super P and CNT of 94:3:3.

In one mixing method, CFx and carbon black are first mixed in a dimethylformamide (DMF) solution to achieve a uniform slurry, and then CNT is added into the slurry while mixing is continued. The solid content of the slurry is within a range of 10% to 30% in one example and 15% to 20% in a more specific example. After mixing, the solvent is removed and the cathode powder is dried for 8-12 hours within an oven set at 60° C. and at full vacuum.

The mixture of powders is thereafter packed, pressed or otherwise provided into volume 21 defined by anode 20 and separator 24 and battery case 12. As shown in FIG. 1A, the anode 20 is an annular ring which surrounds the cathode 22 within the volume 21 in one example embodiment.

Separator 24 comprises an electrically-insulative material that electrically insulates anode 20 and cathode 22 from one another while allowing the electrolyte to pass therethrough. Polyethylene is utilized as the separator 24 in one embodiment in consideration of its mechanical strength in both the machining and transverse directions.

In one more specific embodiment, separator 24 encapsulates the anode 20 and may be implemented as a polyethylene (PE) bag. According to one method, a sheet of polyethylene is folded over upon itself and two sides are sealed together using a hot iron tip leaving one end of the bag open to receive the anode 20 including the lithium metal and copper mesh described above. Following insertion of the anode 20 into the bag, the open end of the bag which received the anode 20 is sealed to encapsulate the anode 20 within separator 24. Thereafter, the anode 20 and separator 24 are inserted into the volume 13 of battery case 12 and the separator 24 electrically insulates the anode 20 from the battery case 12 and the subsequently-formed cathode 22. The above-described example separator 24 reduces chances of cell shorting during assembly and also reduces self-discharge during long-term storage of battery 10. The separator 24 may be implemented using different materials or configurations in other embodiments to suitably insulate the components of battery 10.

Following provision of anode 20 and separator 24 within battery case 12, the mixture of powders of cathode 22 are packed into volume 21 defined by anode 20 and separator 24 without use of a solvent or binder. Thereafter, the electrolyte is introduced into the volume 13 to contact and soak anode 20 and cathode 22. The mixture of powders of cathode 22 are pressed to contact the bottom of the case 12 that functions as a current collector. In addition, terminal connection 16 extends through the mixture of powders of cathode 22 and also contacts the bottom of case 12 in the illustrated embodiment.

In one embodiment, the electrolyte comprises lithium salts, solvents and additives. Some examples of the lithium salts which may be used include LiPF₆, LiClO₄, LiAsF₆, LiBF₄, LiAlCl₄, LiCl, LiBr, CF₃SO₃Li, (C₂O₄)₂BLi (LiBOB), (CF₃SO₂)₂NLi (LiTFSI), (FSO₂)₂NLi (LiFSI) and CF₃COOLi. The solvents include ether and carbonate compounds. Example ether compounder that may be used include 1,2-dimethoxyethane (DME), 1,3-dioxolane (DOL), Tetrahydrofuran (THF) and 2-methyltetrahydrofuran and example carbonates that may be used include dimethyl carbonate (DMC), diethyl carbonate (DEC), ethyl methyl carbonate (EMC), ethylene carbonate (EC) and propylene carbonate (PC). Examples of the additives that may be used include vinylene carbonate (VC), fluoroethylene carbonate (FEC), LiNO₃ and (C₂O₄)F₂BLi (LiDFOB). The lithium salts may be used alone or in any combination and are dissolved in the above-mentioned organic solvents at a concentration of 0.5 to 6M in a first range and 0.8 to 1.5M in a more specific range. The percentage of additives in the electrolyte may be within a first range 0.1% to 10%, or a second range of 0.5 to 3%. One specific electrolyte which may be used in battery 10 is 1M LiTFSI in DME/PC (1:1, by volume)+1% FEC. In another embodiment, the electrolyte is 1M LiTFSI in DME/DOL.

Following introduction of the electrolyte into battery case 12, the top of battery 10 is sealed as described below in one embodiment.

Referring to FIG. 1C, an additional configuration of battery 10a is shown according to another embodiment. Battery 10a includes an anode 20a having a nested configuration including a first anode structure 30 which defines the volume 21 and a second anode structure 32 which is received within volume 21 in the illustrated embodiment. Anode structures 30, 32 are encapsulated by respective separators 24 which electrically insulate anode structures 30, 32 from battery case 12 and cathode 22. Second anode structure 32 and its separator 24 define a volume 33.

The anode structures 30, 32 of anode 20a are electrically coupled with one another within battery 10. In one embodiment, the terminal connections 14 coupled with the anode structures 30, 32 are electrically coupled with one another by welding.

The mixture of powders of cathode 22 are provided into volumes 21, 33 and the top is thereafter sealed to form battery 10a. The arrangement of FIG. 1C has increased balancing of negative and positive electrode capacity and increased deliverable capacity compared with the arrangement of FIGS. 1A and 1B. The arrangement of FIG. 1C also allows enlargement of the dimensions of the battery without increasing the internal resistance. The dimensions and locations of the anode structure 32 within volume 21 are flexible and may be optimized for different applications.

Example manufacture of another embodiment of battery 10b is discussed below with respect to FIGS. 2A-C.

Referring to FIG. 2A, a soluble pore filler material 38 has been included within the mixture of powders of cathode 22a that are provided into volume 21 within battery case 12 followed by a soaking process in the liquid electrolyte. Example pore fillers 38 which may be used include 1% to 20% lithium salts (LiFSI, LiTFSI) or organic compounds (EC, glyme oligomers). One specific pore filler is LiFSI in an amount of 10% of the weight of the mixture of powers of cathode 22a in one embodiment.

Referring to FIG. 2B, the pore fillers dissolve while soaking in the electrolyte within the volume 21 of battery case 12 forming a plurality of internal pores 40 within cathode 22b which receive the electrolyte and facilitate wetting of the cathode 22b with the electrolyte. Air bubbles from pores 40 and otherwise present in the mixture of powders of cathode 22b diffuse outwardly of the volume 21 which allows increased penetration of the electrolyte into the cathode 22b compared with arrangements which do not utilize the soluble pore filler material. The dissolved LIFSI may also operate as a lithium salt in the electrolyte.

Referring to FIG. 2C, the diffused air bubbles have been replaced by electrolyte 42 within the cathode 22c within volume 21. The top of the battery case 12 is sealed to form battery 10b following the provision of the anode 20, cathode 22, separator 24 and electrolyte within volume 13.

Example manufacture of another embodiment of battery 10c is discussed below with respect to FIGS. 3A-3C.

Figures 3A, 3B, 3C:
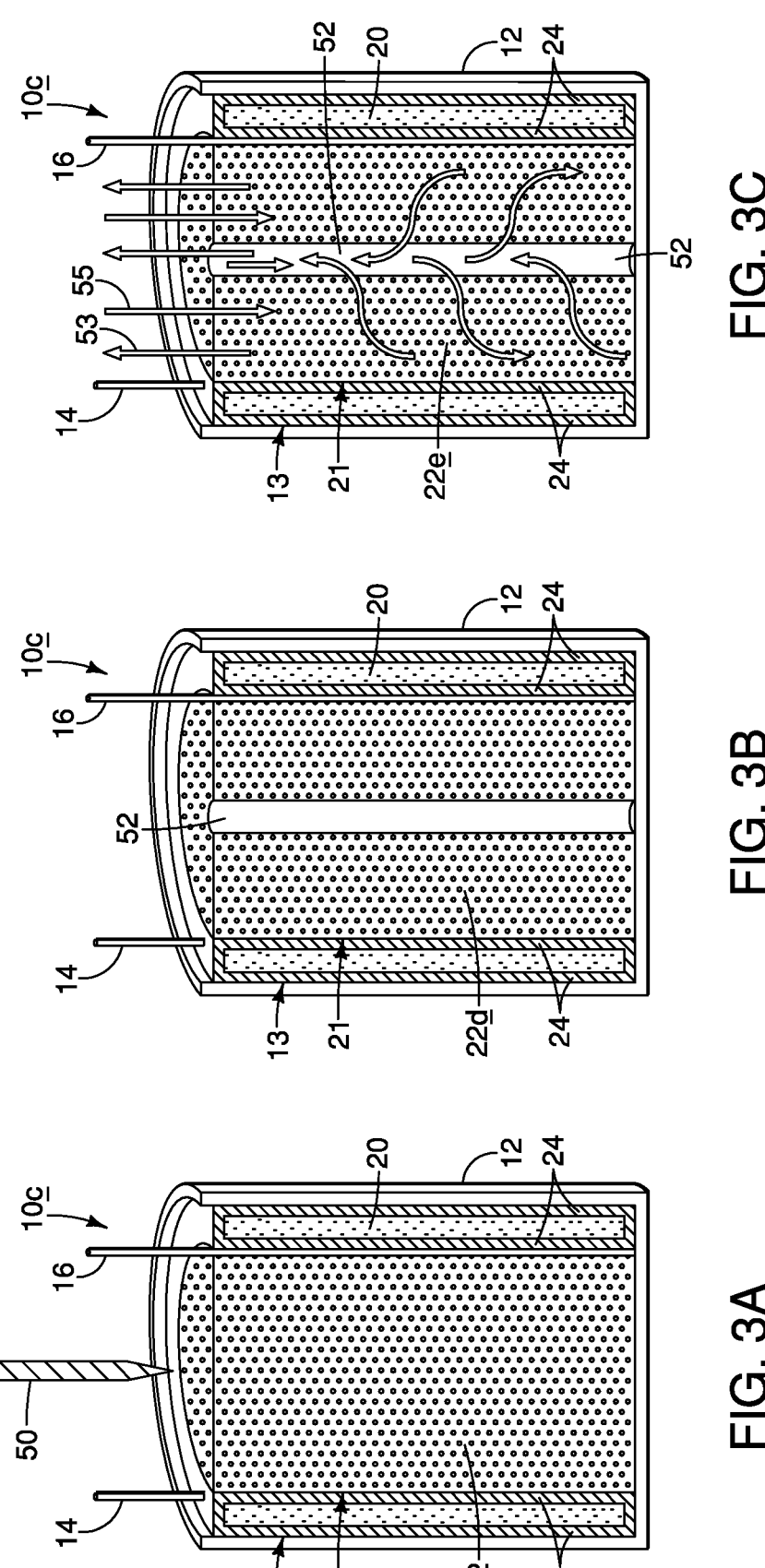
FIGS. 3A-3C illustrate a method of manufacturing a battery according to one embodiment.

Referring to FIG. 3A, the mixture of powders of cathode 22 have been packed within volume 21 following insertion of anode 20 and separator 24 into volume 13 defined by battery case 12. Thereafter, a drill 50 is used to increase the wetting of the cathode 22 with the electrolyte by forming an aperture or ion conductive channel 52 within cathode 22d as shown in FIG. 3B and which subsequently receives the electrolyte during soaking.

Referring to FIG. 3C, electrolyte is introduced into the battery case 12 to soak anode 20 and cathode 22e. Aperture 52 facilitates diffusing of air bubbles present in the mixture of powders externally of the cathode 22e and diffusing of the electrolyte into cathode 22e. The aperture 52 is located at the center of cathode 22e and has a diameter of 0.3 mm in the illustrated embodiment.

The formation of aperture 52 within cathode 22d accelerates full wetting of the entire cathode 22e, improves the utilization rate of the active materials, enables storage of an increased amount of electrolyte and provide additional accommodation for cathode swelling during discharge of the battery 10c compared with the battery arrangements of FIGS. 1 and 2.

The provision of aperture 52 within cathode 22d also enables reduced amounts of soaking time of the electrolyte for wetting of the cathode 22e compared with the battery arrangements of FIGS. 1-1C and 2A-2C. The battery 10c combines high cathode active material loading (ca.3.6 mg CFx), good wetting of the cathode active material and reserve some room for swelling of the cathode 22e. Different numbers, sizes and/or locations of apertures 52 may be formed within the cathode 22 in other embodiments.

In some manufacturing methods, the use of pore fillers in the powders of the cathode described with respect to FIGS. 2A-2C may be combined with the techniques described with respect to FIGS. 3A-3C to provide increased wetting of the cathode with the electrolyte compared with use of only one of the individual manufacturing methods.

Example manufacture of another embodiment of battery 10c is discussed below with respect to FIGS. 4A-4B.

Figures 4A, 4B:
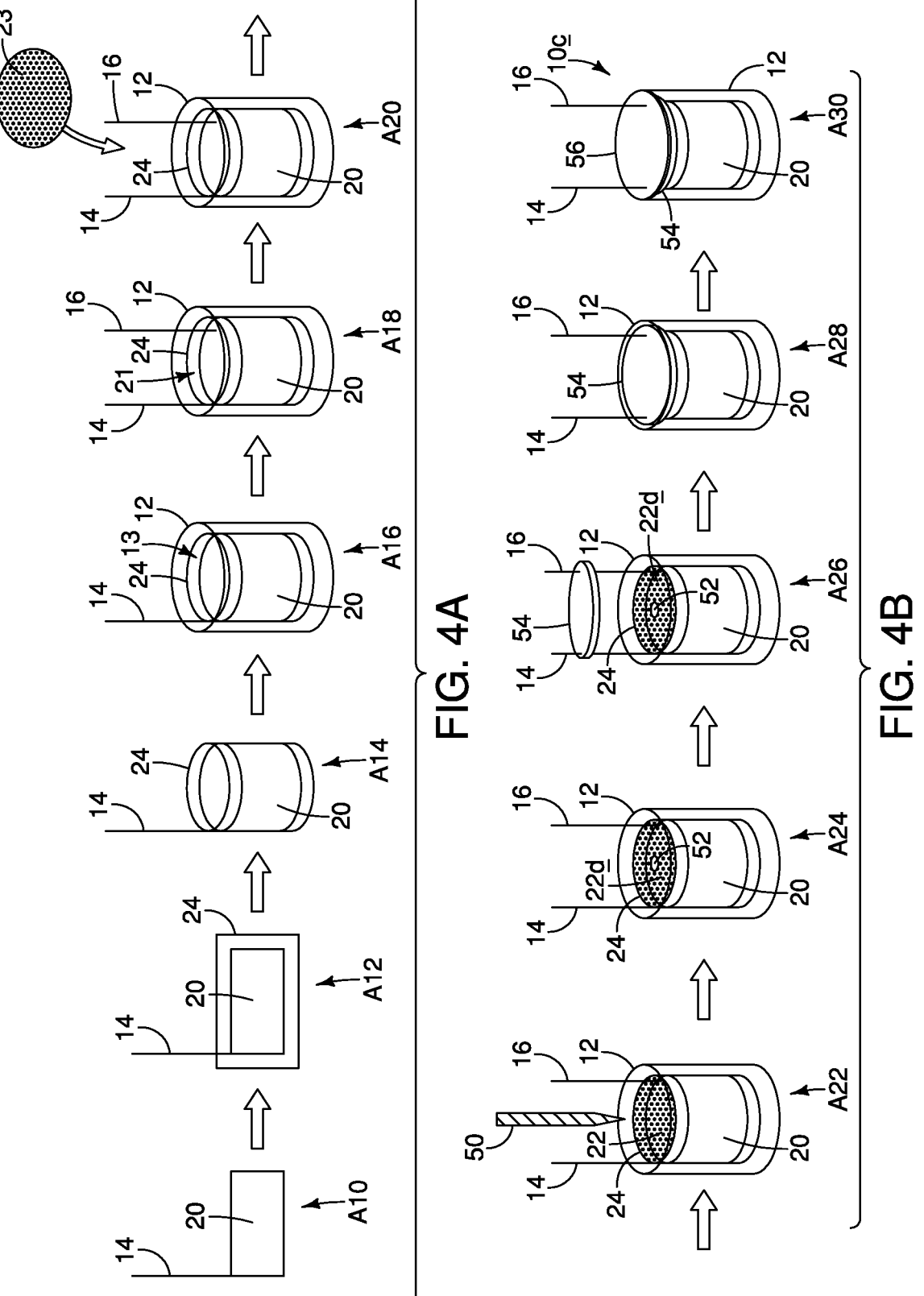
FIGS. 4A-4B illustrate a method of manufacturing a battery according to one embodiment.

Referring to FIG. 4A, lithium metal is pressed upon a copper mesh structure (not shown) to form anode 20 at an Act A10. Anode terminal connection 14 in the form of a copper wire is attached for example by welding to the copper mesh structure. In one embodiment, the copper mesh structure has hole diameters of 1 mm and a suitable commercially available copper mesh structure is item number EQ-bccnf-9u-10 from MTI Corporation.

The anode 20 is sealed and encapsulated within separator 24 in the form of a polyethylene (PE) bag at an Act A12.

At an Act A14, the anode 20 and separator 24 are rolled into a cylindrical shape.

At an Act A16, the anode 20 and separator 24 are inserted into volume 13 defined by battery case 12.

At an Act A18, the cathode terminal connection 16 in the form of a nickel wire is inserted into volume 21 defined by anode 20 and separator 24.

At an Act A20, the volume 21 is filled with the mixture of powders 23 that includes the cathode active material to form cathode 22 as discussed in example embodiments above.

At an Act A22, a drill 50 is aligned with a desired location over cathode 22 to form an aperture therein.

At an Act A24, the aperture 52 has been drilled within cathode 22d.

At an Act A26, a rubber disk 54 is placed over the top of battery case 12 with terminal connections 14, 16 passing therethrough and electrolyte is thereafter introduced into battery case 12 to contact the anode 20 and cathode 22.

At an Act A28, the rubber disk 54 is pressed down towards anode 20 and cathode 22 below the upper portion of the battery case 12.

At an Act A30, the top portion of battery case 12 is folded inwardly over the rubber disk 54. In one embodiment, a seal 56 in the form of epoxy is applied over the folded portions of battery case 12 and the rubber disk to seal the anode, cathode and electrolyte within battery case 12. The plug 54 and seal 56 may also be used with other embodiments of the battery discussed above and plug 54 and seal 56 are one illustrative implementation of the top structure discussed above with respect to FIG. 1.

The batteries described herein have increased cell capacity and energy storage compared with conventional batteries of the same sizes for use in broad applications. Some of the disclosed embodiments eliminate the necessity of cathode film preparation and lamination. Accordingly, more capacity and energy will be delivered from batteries configured and constructed according to example embodiments described herein. The manufacturing methods also simplify the battery fabrication process and cost for future mass production.

Some embodiments described herein maximize the restricted volume of microbatteries without sacrificing the utilization rate of the electroactive materials. In addition, batteries may be fabricated without slurry making and coated processes of conventional jelly-roll battery designs thereby significantly reducing the cost and time needed for electrode fabrication. The direct use of electroactive powders eliminates the weight and volume of binder and current collector foils thus improving cell-level capacity.

Microbatteries having a configuration shown in FIG. 1C have been constructed with up to 50% increase in capacity (i.e., from 1.5 to ~2.5 mAh) compared with conventional batteries of the same dimensions. By lessening or eliminating binder and conductive powder, the energy density can be increased over previous jelly-roll designs.

As discussed above according to some embodiments, ion conductive channels may be formed inside densely packed powders of the cathode to increase the utilization rate of active materials. The designs discussed herein additionally provide enhanced yield and reliability compared with batteries of conventional designs.

Microbatteries discussed herein may be utilized in numerous applications including use within compact transmitters which are inserted within eel and lamprey. Additional applications of use include pacemakers, hearing-aids, defibrillators, in-vivo imaging devices, and self-powered microelectronics, such as miniature transmitters, sensors and actuators. In addition, the example methods of manufacture described herein enable the cell fabrication process to be simplified at reduced cost for mass production compared with conventional methods.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A battery comprising:
a cylindrical battery case;
a first electrode having a first electrical polarity within the battery case;
a second electrode having a second electrical polarity within the battery case, wherein the first and second electrical polarities are different;
a separator configured to electrically insulate the first electrode from the second electrode and the battery case;
an electrolyte in contact with the first and second electrodes;
first and second terminal connections connected with respective ones of the first and second electrodes, and wherein the first and second terminal connections are configured to conduct electrons between the first and second electrodes via a load which is external of the battery case; and
wherein the separator encapsulates the first electrode.

2. The battery of claim 1 wherein the first electrode defines a first volume and the second electrode is within the first volume defined by the first electrode.

3. The battery of claim 2 wherein the first electrode surrounds the second electrode.

4. The battery of claim 1 wherein the first electrode comprises lithium.

5. The battery of claim 1 wherein the second electrode comprises CFx or $MnO_2$ powder.

6. The battery of claim 5 wherein the second electrode comprises at least one carbon additive configured to increase the electrical conductivity of the second electrode.

7. The battery of claim 1 wherein the second electrode comprises pores to receive the electrolyte.

8. The battery of claim 1 wherein the second electrode comprises at least one aperture which receives the electrolyte.

9. The battery of claim 1 wherein the battery is a micro-battery.

10. The battery of claim 1 wherein the battery case is electrically conductive and the second terminal connection and the second electrode contact the battery case.

11. The battery of claim 1 wherein the first electrode is an anode and the second electrode is a cathode.

12. The battery of claim 1 wherein the first electrode comprises lithium metal and a mesh.

13. The battery of claim 1 wherein the second electrode comprises an aperture that extends into an interior volume of the second electrode.

14. The battery of claim 1 wherein the separator is a single continuous structure.

15. The battery of claim 1 wherein the second electrode contacts the battery case.

16. The battery of claim 1 wherein the battery case has a diameter within a range of 0.5 mm to 10 mm and a length within a range of 1 mm to 100 mm.

17. A battery comprising:
a cylindrical battery case;
a first electrode having a first electrical polarity within the battery case;
a second electrode having a second electrical polarity within the battery case, wherein the first and second electrical polarities are different;
a separator configured to electrically insulate the first electrode from the second electrode and the battery case;
an electrolyte in contact with the first and second electrodes;
first and second terminal connections connected with respective ones of the first and second electrodes, and wherein the first and second terminal connections are configured to conduct electrons between the first and second electrodes via a load which is external of the battery case; and
wherein the first electrode comprises a plurality of different structures within the battery case, and the second electrode is within different volumes defined by the different structures of the first electrode.

18. A battery comprising:
a cylindrical battery case;
a first electrode having a first electrical polarity within the battery case;
a second electrode having a second electrical polarity within the battery case, wherein the first and second electrical polarities are different;
a separator configured to electrically insulate the first electrode from the second electrode and the battery case;
an electrolyte in contact with the first and second electrodes;
first and second terminal connections connected with respective ones of the first and second electrodes, and wherein the first and second terminal connections are configured to conduct electrons between the first and second electrodes via a load which is external of the battery case; and
wherein the first electrode is an annular ring.

19. A battery comprising:
a cylindrical battery case;
a first electrode having a first electrical polarity within the battery case;
a second electrode having a second electrical polarity within the battery case, wherein the first and second electrical polarities are different;

a separator configured to electrically insulate the first electrode from the second electrode and the battery case;

an electrolyte in contact with the first and second electrodes;

first and second terminal connections connected with respective ones of the first and second electrodes, and wherein the first and second terminal connections are configured to conduct electrons between the first and second electrodes via a load which is external of the battery case; and wherein the first electrode comprises a plurality of separate structures.

20. The battery of claim 13 wherein the aperture is configured to receive the electrolyte and diffuse air from the second electrode.

21. A battery comprising:

a cylindrical battery case;

a first electrode having a first electrical polarity within the battery case;

a second electrode having a second electrical polarity within the battery case, wherein the first and second electrical polarities are different;

a separator configured to electrically insulate the first electrode from the second electrode and the battery case;

an electrolyte in contact with the first and second electrodes;

first and second terminal connections connected with respective ones of the first and second electrodes, and wherein the first and second terminal connections are configured to conduct electrons between the first and second electrodes via a load which is external of the battery case; and wherein the second electrode comprises a void space to accommodate swelling of the second electrode.

22. A battery comprising:

a battery case;

a first electrode comprising anodic material and having a first electrical polarity within the battery case;

a second electrode comprising cathodic material and having a second electrical polarity within the battery case, wherein the first and second electrical polarities are different;

a separator configured to electrically insulate the first electrode from the second electrode and the battery case;

an electrolyte in contact with the first and second electrodes;

a first terminal connection member in contact with the anodic material of the first electrode;

a second terminal connection member in contact with the cathodic material of the second electrode; and wherein the first and second terminal connection members extend outwardly of the battery case.

23. The battery of claim 22 wherein the first and second terminal connection members are each a monolithic member.

24. The battery of claim 23 wherein the second terminal connection member contacts the battery case.

25. The battery of claim 22 wherein the first and second terminal connection members are each a conductive wire.

26. A battery comprising:

a battery case;

a first electrode comprising anodic material and having a first electrical polarity within the battery case;

a second electrode comprising cathodic material and having a second electrical polarity within the battery case, wherein the first and second electrical polarities are different;

a separator configured to electrically insulate the first electrode from the second electrode and the battery case;

an electrolyte in contact with the first and second electrodes;

first and second terminal connections connected with respective ones of the first and second electrodes, and wherein the first and second terminal connections are configured to conduct electrons between the first and second electrodes via a load which is external of the battery case; and wherein the second electrode comprises a void space within the cathodic material to accommodate swelling of the second electrode during discharge of the battery.

27. The battery of claim 26 wherein the void space extends between opposing surfaces of the battery case.

28. The battery of claim 26 wherein the void space is an aperture in the second electrode.

29. The battery of claim 28 wherein the aperture has a diameter of about 0.3 mm.

30. A battery manufacture method comprising:

providing a cylindrical battery case;

providing a first electrode having a first electrical polarity within the cylindrical battery case;

providing a second electrode having a second electrical polarity within the cylindrical battery case, wherein the first and second electrical polarities are different;

providing a separator configured to electrically insulate the first electrode from the second electrode and the cylindrical battery case;

providing an electrolyte in contact with the first and second electrodes;

providing first and second terminal connections connected with respective ones of the first and second electrodes, and wherein the first and second terminal connections are configured to conduct electrons between the first and second electrodes via a load which is external of the cylindrical battery case; and wherein the separator encapsulates the first electrode.

31. The method of claim 30 further comprising encapsulating the first electrode within the separator comprising electrically-insulative material before providing the first electrode within the cylindrical battery case.

32. The method of claim 30 further comprising forming the first electrode comprising providing lithium metal on a mesh prior to providing the first electrode within the cylindrical battery case.

33. The method of claim 30 wherein the providing the first electrode comprises:

providing a first structure in the cylindrical battery case which defines a volume; and providing a second structure within the volume defined by the first structure.

34. The method of claim 33 wherein the volume is a first volume, the second structure defines a second volume, and the providing the second electrode comprises providing cathode material within the first and second volumes.

35. The method of claim 30 wherein the first electrode comprises lithium.

36. The method of claim 30 further comprising forming an aperture within the second electrode which receives the electrolyte.

37. The method of claim 30 further comprising forming a plurality of pores within the second electrode which receive the electrolyte.

38. The battery of claim 1 wherein the second electrode is a powder.

* * * * *